Aug. 28, 1928.
L. A. PARADISE
1,682,143
CORN PICKING ROLLS
Filed June 8, 1927
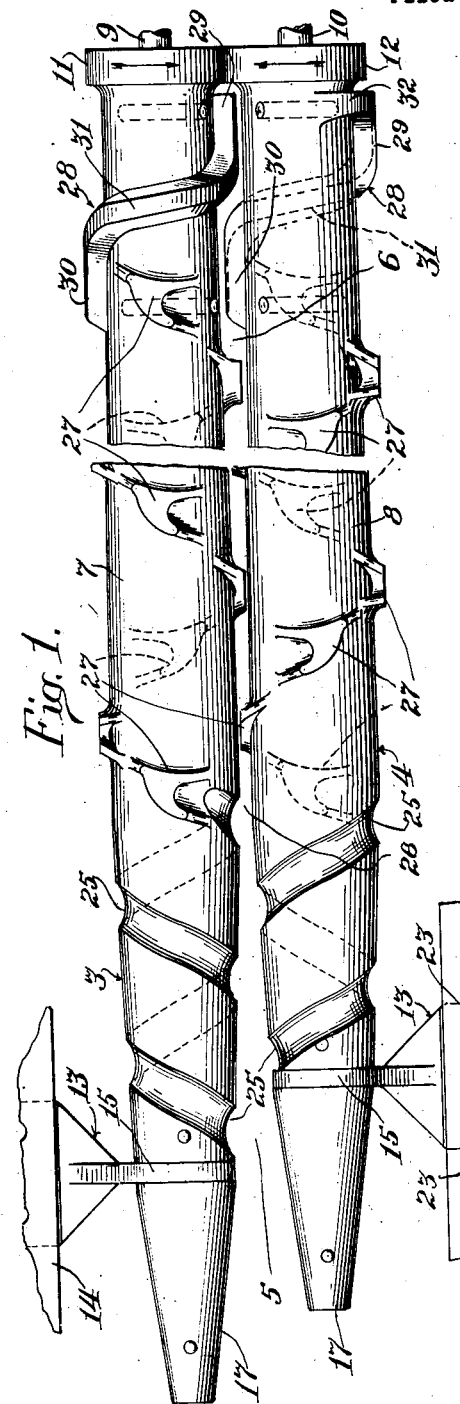
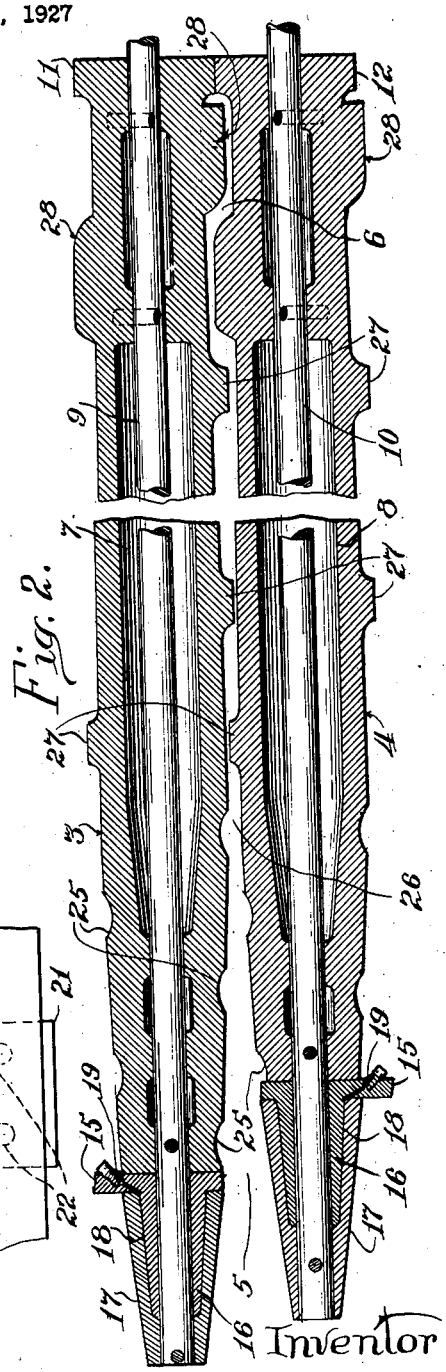
Inventor
Louis A. Paradise,
By John L. Jackson
Attorney
Witness
Milton Lenoir Patented Aug. 28, 1928.

1,682,143

UNITED STATES PATENT OFFICE.

LOUIS A. PARADISE, OF MOLINE, ILLINOIS, ASSIGNOR TO DEERE & COMPANY, OF MOLINE, ILLINOIS, A CORPORATION OF ILLINOIS.

CORN-PICKING ROLLS.

Application filed June 8, 1927. Serial No. 197,310.

The present invention relates to corn picking rolls such as are employed on corn picking machines for picking or snapping the ears of corn from the stalks, such rolls being also referred to as snapping rolls.

Heretofore these snapping rolls have been more or less subject to the objection that the husks and stalks have a tendency to become wound and entangled with the rolls, resulting in the clogging of the machine. It is the principal object of the present invention to obviate this difficulty by providing rolls of an improved construction, which will permit them to clear themselves more efficiently of the stalks and other trash, the present improvement residing particularly in a trash discharge opening between the rolls which tapers rearwardly or is of increased width adjacent to the rear ends of the rolls.

Other objects and advantages pertaining to the more specific features of the invention will be apparent from the following description of a preferred embodiment thereof.

In the drawing illustrating such embodiment:

Figure 1 is a plan view of the present rolls, the intermediate portions thereof being broken away to illustrate the same on a larger scale; and Figure 2 is a longitudinal sectional view through both rolls.

In the conventional construction of corn picking machines the two rolls 3 and 4 are usually mounted along the inner edges of two spaced gathering arms which extend longitudinally of the machine at one side thereof, and which serve to guide the stalks between the rolls. The stalks enter a tapered throat area 5 defined between the tapered front ends of the rolls, and move progressively back towards the rear ends of the rolls in a trash discharge slot or opening 6. The rolls are usually inclined downwardly and forwardly so that the tapered front ends of the rolls first engage the lower portions of the stalks, and both rolls are rotated in opposite directions, downwardly towards each other as indicated by the arrows, so that as the stalks move rearwardly between the rolls they are caught and fed downwardly for snapping the ears from the stalks.

Both rolls comprise hollow trunks portions 7 and 8, which are keyed or pinned on individual shafts 9 and 10 respectively. The shafts extend throughout the entire lengths of the rolls, and each roll is preferably formed with a plurality of spaced boss portions engaging with the shaft and affording spaced points of support of the roll on the shaft. The shafts preferably extend on parallel axes, with the rolls held spaced from each other, except at the rear ends where collars 11 and 12 extend from the trunk portions of the rolls and have rolling contact with each other. The upper ends of the shafts 9 and 10 are usually geared together and are driven from any desired source of power. The forward ends of the shafts have bearing support in brackets 13—13 which are mounted on the longitudinal frame members 14 of the gathering arms. Each of these bearing supports comprises a laterally extending arm portion 15 from one side of which projects a bearing sleeve 16 through which the shaft passes. Such bearing sleeve extends downwardly from the arm towards the front end of the shaft, the latter projecting beyond the end of the bearing sleeve. Mounted on these projecting shaft ends are pointed tips or caps 17 which are pinned to their indvidual shafts so as to rotate with the rolls. The outer bearing surface of each bearing sleeve 16 is preferably tapered, and the companion bearing surface of the tip or cap 17 is correspondingly tapered to engage therewith, as indicated at 18. Lubricant is supplied to these bearing surfaces through inclined drill holes 19 which extend down through the arm portions 15 of the bearing brackets 13. It will be observed by having the bearing sleeve 16 extend downwardly from the bearing arms 15 the lubricant will have a gravitational feed down along the bearing surfaces 18. The ends of the rolls preferably abut against the flat upper sides of the arms 15. The bearing brackets comprise plate portions 21 for bolting to the frame members 14, such plate portions preferably having elongated slots 22 therein for receiving the bolts 23, whereby the bearing supports may be shifted inwardly or outwardly to adjust the spacing between the front ends of the rolls.

The trunk portion of each roll tapers downwardly to a smaller diameter adjacent the front end thereof to form the tapered feeding throat 5. The inner roll 3 is preferably slightly longer than the outer roll 4. Formed in such tapered front ends are spiral grooves 25, which have a direction of lead for feeding the stalks rearwardly between the rolls.

These grooves terminate adjacent the apex of the throat 5, which point I have indicated at 26. At this point the stalks come under the action of snapping lugs 27 projecting from both rolls. These snapping lugs are cast integral with the trunk portions of the rolls, preferably in the form of U-shaped raised ribs having their open sides facing in the direction of rotation of the roll so as to embrace the stalk and snap the ears therefrom. Such lugs are arranged in spiral sequence about the rolls, having a direction of lead such as will tend to feed the stalks rearwardly between the rolls.

Adjacent their rear end the rolls are formed with cams or lugs 28 which assist in ejecting the stalks and trash from between the rolls. The cams on both rolls are duplicates and each comprises diametrically opposite, longitudinally extending ribs 29—30, which are joined by a curved or spiral rib 31. The upper end of each rear rib 29 is also formed with a short, laterally extending rib 32, which projects from the leading edge of the longitudinal rib 29. The cams are so timed with respect to the rotation of the rolls that the rear rib 29 of one roll and the front rib 30 of the other roll move down through the intervening trash discharge opening 6 at substantially the same time. Such cams prevent the stalks, husks, etc. from lodging between the rear ends of the rolls and becoming wound and entangled thereon.

Attention is now directed to the fact that the trash discharge slot 6 has a gradually increasing taper from the throat point 26 back to the rear ends of the rolls. This increasing width of slot area is preferably obtained by forming the trunk portions of both rolls with a taper which diminishes in diameter towards the rear end of the rolls. As clearly shown in Figure 1, such taper begins at the throat point 26 of the rolls and extends to the rear ends thereof. It is desirable that the spacing between the peripheries of the lugs 26 and the trunk portions of the rolls remain substantially the same throughout the entire lengths of the rolls, and hence these lugs successively project further from each trunk portion towards the rear ends of the rolls. Thus while the trunk portions have a diminishing taper towards the rear ends of the rolls, the lug extremities have an increasing taper or increasing radial dimension in this same direction.

In the operation of the rolls, the stalks are fed rearwardly and downwardly by the gripping action of the lugs 27 engaging therewith, at which time the ears are squeezed or snapped from the stalks. The major portion of this snapping work is performed near the throat 26 and immediately in rear thereof. The bulk of the stalks and other trash is discharged from between the rolls adjacent the rear ends thereof. It will, therefore, be seen that by virtue of the gradually widening area of the slot 6 the capacity of the rolls for discharging the trash increases towards the rear ends of the rolls so that there is a minimum possibility of the trash becoming clogged between or wound upon the rolls. The cams 28—28 also cooperate with this increasing width of slot area by forcibly ejecting the stalks at the rear ends of the rolls and thus preventing clogging thereof.

What I claim as my invention and desire to secure by Letters Patent is:

1. A pair of cooperating corn snapping rolls having their axes substantially parallel and characterized by a trash discharge opening between the rolls which is wider at the rear ends of the rolls than at the front ends thereof.

2. A pair of cooperating corn snapping rolls defining a trash discharge opening therebetween which increases in width towards the rear ends of the rolls.

3. A pair of cooperating corn snapping rolls wherein the trunk portion of one of such rolls is tapered to define a trash discharge slot between the rolls which increases in width towards the rear ends thereof.

4. A pair of cooperating corn snapping rolls comprising trunk portions which taper with a diminishing diameter towards the rear ends of said rolls to define a rearwardly widening trash discharge opening between the rolls, and snapping lugs on said trunk portions moving through said opening.

5. A pair of cooperating corn snapping rolls comprising trunk portions which taper with a diminishing diameter towards the rear ends of said rolls to define a rearwardly widening trash discharge opening between the rolls, and snapping lugs spirally arranged on said trunk portions in directions tending to feed the stalks rearwardly between the rolls.

6. A pair of cooperating corn snapping rolls comprising trunk portions which taper with a diminishing diameter towards the rear ends of said rolls to define a rearwardly widening trash discharge opening between the rolls, snapping lugs on said trunk portions, and cams on the rear ends of said trunk portions for ejecting the trash through said opening.

7. A pair of cooperating corn snapping rolls comprising trunk portions which taper with a diminishing diameter towards the rear ends of said rolls to define a rearwardly widening trash discharge opening between the rolls, and lugs on each of said rolls, the peripheries of which lugs have a substantially uniform spacing from the trunk portion of the opposing roll.

8. A pair of cooperating corn snapping rolls comprising trunk portions which taper with a diminishing diameter towards the rear ends of said rolls to define a rearwardly widening trash discharge opening between the rolls, and lugs on said rolls, the radial dimensions of which increase progressively towards the rear ends of said rolls to maintain a substantially uniform spacing between the peripheral faces of said lugs and the tapered trunk portions of said rolls.

9. A pair of cooperating corn snapping rolls comprising trunk portions which taper with a diminishing diameter towards the rear ends of said rolls to define a rearwardly widening trash discharge opening between the rolls, and lugs on said rolls in the form of U-shaped ribs having their open sides facing in the direction of rotation of said rolls.

10. A pair of cooperating corn snapping rolls comprising trunk portions each having a diminishing taper extending forwardly from an intermediate point thereof, and a diminishing taper extending rearwardly from said intermediate point, feeding grooves spiralled in the forwardly extending tapered portions to lead the stalks rearwardly between the rolls, and snapping lugs on said rearwardly extending tapered portions.

11. In combination, a pair of inclined corn snapping rolls, one of said rolls having a shaft extension at its lower end, a bearing support for said roll comprising a laterally extending supporting arm, and a bearing sleeve extending downwardly from said arm and having said shaft extension rotatably supported therein.

12. In combination, a pair of inclined corn snapping rolls, shafts extending axially through said rolls and projecting from the lower ends thereof, bearing supports for said rolls each comprising a laterally extending arm, the lower end of the corresponding roll bearing against the upper side of said arm, a bearing sleeve projecting from the lower side of said arm, the projecting end of the roll shaft extending through said bearing sleeve, and cap members secured to said shafts and embracing said bearing sleeves.

LOUIS A. PARADISE.